(12) United States Patent
Matsuda et al.

(10) Patent No.: US 11,206,086 B2
(45) Date of Patent: Dec. 21, 2021

(54) OPTICAL TRANSCEIVER

(71) Applicant: Nippon Telegraph and Telephone Corporation, Tokyo (JP)

(72) Inventors: Toshiya Matsuda, Tokyo (JP); Toru Homemoto, Tokyo (JP); Kana Masumoto, Tokyo (JP); Masaru Katayama, Tokyo (JP); Kazuyuki Matsumura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/054,596

(22) PCT Filed: May 22, 2019

(86) PCT No.: PCT/JP2019/020216
§ 371 (c)(1),
(2) Date: Nov. 11, 2020

(87) PCT Pub. No.: WO2019/230514
PCT Pub. Date: Dec. 5, 2019

(65) Prior Publication Data
US 2021/0143911 A1 May 13, 2021

(30) Foreign Application Priority Data
May 30, 2018 (JP) .............................. JP2018-103345

(51) Int. Cl.
*H04B 10/00* (2013.01)
*H04B 10/40* (2013.01)
(Continued)

(52) U.S. Cl.
CPC ......... *H04B 10/40* (2013.01); *H04B 10/0773* (2013.01); *H04B 10/506* (2013.01); *H04B 10/572* (2013.01); *H04B 10/69* (2013.01)

(58) Field of Classification Search
CPC .. H04B 10/40; H04B 10/0773; H04B 10/506; H04B 10/572; H04B 10/69; H04B 10/07;
(Continued)

(56) References Cited

U.S. PATENT DOCUMENTS

2013/0262851 A1* 10/2013 Hirvonen ................ G06F 21/56
713/150
2018/0048391 A1* 2/2018 Tanaka ................ G06F 13/4234

FOREIGN PATENT DOCUMENTS

JP 2014-150426 8/2014
JP 2017-153148 8/2017

OTHER PUBLICATIONS

Lewis et al., "Tunable SFP+ Memory Map for ITU Frequencies," SFF Committee, Jan. 23, 2013, 9 pages.

* cited by examiner

*Primary Examiner* — Hibret A Woldekidan
(74) *Attorney, Agent, or Firm* — Fish & Richardson P.C.

(57) ABSTRACT

[Problem] To allow addition of new functions to an optical module at a low cost.
[Solution] An optical transceiver 11a includes a CPU 21 configured to perform download control of a program for executing an additional function to be newly added to the optical transceiver 11a, a wireless transmitting and receiving device 22 configured to receive, in accordance with the download control, the program from a terminal device 13 that stores various programs, and a memory unit 23 configured to store the program that is received. The CPU 21 is configured to perform, by interrupting a monitoring and control signal from a transmission device 12, control to write data related to transmission and reception processing of a Tx 25a and a Rx 26a in accordance with execution of the
(Continued)

programs stored in the memory unit 23 in a storage area at a specific address of an EEPROM 24.

5 Claims, 6 Drawing Sheets

(51) Int. Cl.
    *H04B 10/077*     (2013.01)
    *H04B 10/50*     (2013.01)
    *H04B 10/572*     (2013.01)
    *H04B 10/69*     (2013.01)

(58) Field of Classification Search
    CPC ... H04B 10/11; H04B 10/114; H04B 10/1143; H04B 10/25; H04B 10/2575; H04B 10/803; H04B 1/385; H04B 10/0779; G06F 21/56; G06F 2213/3808; H04L 63/123; H04N 5/33; H04N 7/185
    USPC ........ 398/135, 138, 139, 115, 116, 117, 137, 398/158, 162, 196, 195
    See application file for complete search history.

OPTICAL TRANSCEIVER

CROSS-REFERENCE TO RELATED APPLICATIONS

This application is a National Stage application under 35 U.S.C. § 371 of International Application No. PCT/JP2019/020216, having an International Filing Date of May 22, 2019, which claims priority to Japanese Application Serial No. 2018-103345, filed on May 30, 2018. The disclosure of the prior application is considered part of the disclosure of this application, and is incorporated in its entirety into this application.

TECHNICAL FIELD

The present invention relates to an optical transceiver configured to convert electrical signals into optical signals and transmit and receive the optical signals and mounted on a pluggable (detachable) small-sized optical module.

BACKGROUND ART

In recent years, an increase in capacities of small-sized optical modules on which optical transceivers are mounted has further advanced with a background of a rapid increase in traffic of data centers. On the other hand, optical modules configured to output predetermined optical signals of wavelength division multiplex (WDM) grids have been developed in order to directly connect the data centers. For example, sale of optical modules equipped with wavelength tunable function compatible with WDM (Non Patent Literature 1) in small-sized optical modules such as 10 Gigabit Small Form Factor Pluggable (XFP) and Small Form-factor Pluggable (SFP+), which are standards for 10 Ghz, has begun. Utilization of these optical modules enables construction of a WDM system at low costs.

In a case in which a new function such as a wavelength tunable function compatible with WDM is added to the same platform as a small-sized optical module such as an XFP or an SFP+, a reserved address of an Electrically Erasable Programmable Read-Only Memory (EEPROM) for monitoring and control is allocated to the additional function. The additional function becomes available through reading and writing of values stored at the allocation destination address. Thus, the transmission device side such as a server or a router in which the optical module is installed becomes compatible with the additional function through change of software or firmware without changing hardware.

As methods for more flexibly controlling a monitoring and control function of such a small-sized optical module, a method of including a controller capable of rewriting programs inside a module (Patent Literature 1), an in-band control signal multiplexing method (Patent Literature 2), and the like have been proposed.

CITATION LIST

Patent Literature

Patent Literature 1: JP 2014-150426 A
Patent Literature 2: JP 2017-153148 A

Non Patent Literature

Non Patent Literature 1: SFF-8690, Tunable SFP+ Memory Map for ITU Frequencies, [online], 2013, SFF Committee, [searched on May 16, 2018], Internet: <URL; https://doc.xdevs:com/doc/Seagate/SFF-8690.PDF>

SUMMARY OF THE INVENTION

Technical Problem

As described above, the transmission device side in which the small-sized optical module is installed can technically support an additional function of the small-sized optical module with a change of software or firmware. However, with the new software or firmware after the change, connection to optical modules of the same platform of the related art that may be connected in addition to the optical module to which the function has been added has to be verified. Because this verification requires a long verification time and a larger number of operation processes, there is a problem of an increase in costs.

The present invention was made in view of such circumstances, and an object thereof is to provide an optical transceiver capable of adding new functions to an optical module at low costs.

Means for Solving the Problem

As a means for solving the aforementioned problems, the invention according to first aspect provides an optical transceiver that includes an optical transmitter configured to convert an electrical signal input from a transmission device that transmits a signal into an optical signal and output the optical signal, an optical receiver configured to convert an optical signal received via an optical interface (IF) into an electrical signal and output the electrical signal to the transmission device, and a nonvolatile memory configured to allow the transmission device to read and write data in a storage area at a specific address such that the optical transmitter and the optical receiver are able to be controlled, the optical transceiver including: a Central Processing Unit (CPU) configured to perform download control of a program for executing an additional function to be newly added to the optical transceiver; a wireless transmitting and receiving device configured to receive, in accordance with the download control, the program from a terminal device that stores various program; and a memory unit configured to store the program that are received, in which the CPU performs, by interrupting a monitoring and control signal from the transmission device, control to write, in the storage area at the specific address in the nonvolatile memory, data related to transmission and reception processing of the optical transmitter and the optical receiver in accordance with execution of the program stored in the memory unit.

With this configuration, the CPU downloads the program to execute additional functions using the wireless transmitting and receiving device, stores the program in the memory unit through the download control, and further reads and writes data related to the program to execute the additional functions stored in the memory unit in the nonvolatile memory (EEPROM) by interrupting a monitoring and control signal. The processing enables addition of the new functions without changing setting of an external transmission device connected to the optical transceiver. Because this makes verification of the transmission device that leads to an increase in cost in relation to addition of new functions as in the related art unnecessary, it is possible to achieve an optical transceiver capable of easily adding new functions to an optical module at low costs.

The present invention according to second aspect is the optical transceiver according to first aspect, in which the memory unit stores, as the program, a pairing program configured to cause the CPU to execute processing of establishing pairing in which the optical transceiver and an opposite optical transceiver perform wireless communication with each other using the wireless transmitting and receiving devices and transmission and reception of signal light via the optical IF are synchronously performed, an optical input level monitoring program configured to cause the CPU to execute processing of monitoring a received signal level at the optical receiver, and a wavelength control program configured to cause the CPU to execute processing of sweeping a wavelength of a transmission signal from the optical transmitter and fixing a wavelength resulting from the sweeping at a timing at which a received signal level that is monitored by the monitoring reaches a proper level.

With this configuration, the CPU can monitor the received signal level at the optical receiver in accordance with the optical input level monitoring program when the pairing in which the optical transceiver and the opposite optical transceiver perform wireless communication using the wireless transmitting and receiving devices and transmission and reception of signal light are synchronously performed is established in accordance with the pairing program, and the CPU can perform the processing of sweeping the wavelength of the transmission signal from the optical transmitter and fixing the swept wavelength at the timing at which the monitored received signal level reaches the proper level in accordance with the wavelength control program. It is thus possible to automatically set a wavelength of a signal at the time of communication when the optical transceiver and the opposite optical transceiver perform communication.

The present invention according to third aspect is the optical transceiver according to first aspect, in which the memory unit stores, as the program, an optical input level monitoring program configured to cause the CPU to execute processing of monitoring a received signal level at the optical receiver, a wavelength control program configured to cause the CPU to execute processing of sweeping a wavelength of a transmission signal from the optical transmitter and fixing a wavelength by the sweeping at a timing at which a received signal level by the monitoring reaches a proper level, and an optical output control program configured to cause the CPU to execute processing of increasing, when a proper received signal level is detected by the monitoring, a numerical value representing a detection timing of the proper received signal level and a wavelength for signal transmission by specific amounts respectively, transmitting a numerical value resitting from the increasing in a transmission signal with a transmission level varying in accordance with a numerical value and with a wavelength resulting from the increasing to the opposite optical transceiver, and setting a wavelength by returning the wavelength by an amount of wavelength corresponding to a numerical value representing the detection timing received by the opposite optical transceiver.

With this configuration, the CPU monitors the received signal level at the optical receiver in accordance with the optical input level monitoring program in a case in which the optical transceiver and the opposite optical transceiver are separated from each other by a distance at which wireless communication cannot be performed using the wireless transmitting and receiving devices. In addition, the CPU sweeps the wavelength of the transmission signal from the optical transmitter in accordance with the wavelength control program, and when the proper received signal level is detected by the monitoring, the CPU increases the numerical value representing the detected timing of the proper received signal level and the wavelength for signal transmission by specific amounts using the optical output control program. The CPU can perform the processing of transmitting the transmission signal with the transmission level varying in accordance with the increased numerical value and with the increased wavelength to the opposite optical transceiver and setting the wavelength by returning the wavelength by the amount of wavelength corresponding to the numerical value representing the detection timing received by the opposite optical transceiver. It is thus possible to automatically set the wavelength of the transmitted and received signal light even in a case in which wireless communication cannot be performed using the wireless transmitting and receiving devices of the mutual optical transceivers.

The invention according to fourth aspect is the optical transceiver according to third aspect, in which by the CPU executing the optical output control program, reception notification data is generated by causing an optical level of transmission signal light from the optical transmitter to vary at a cycle that is shorter than a cycle of a change in wavelength of the transmission signal light through execution of the wavelength control program and that is longer than a detection cycle of the monitoring of an optical input level through execution of the optical input level monitoring program, and the opposite optical transceiver is notified of the reception notification data.

With this configuration, it is possible to cause the optical level to vary with the same wavelength and set data to a proper value by setting the variation of the optical level of the transmission signal light to be shorter than the cycle of the change in wavelength of the transmission signal light. In addition, it is possible to properly monitor the varying signal light on the reception side by causing the optical level to vary at a cycle that is longer than the detection cycle of the optical input level monitoring.

The present invention according to fifth aspect is the optical transceiver according to first aspect, in which the memory unit stores, as the program, an optical input level monitoring program configured to cause the CPU to execute processing of monitoring a received signal level at the optical receiver, a wavelength control program configured to cause the CPU to execute processing of sweeping a wavelength of a transmission signal from the optical transmitter and fixing a wavelength by the sweeping at a timing at which a received signal level by the monitoring reaches a proper level, and a state notification program configured to cause the CPU to execute processing in which the optical transceiver receives a wavelength that is set for another optical transceiver connected to a wavelength division multiplex device via the wireless transmitting and receiving device and sets a wavelength other than the wavelength that is received as a wavelength for transmission, the wavelength division multiplex device being inserted between the optical transceiver itself and the opposite optical transceiver.

With this configuration, the CPU can perform the processing of receiving the wavelength that is set for another optical transceiver via the wireless transmitting and receiving device and setting a wavelength other than the received wavelength as a wavelength for transmission. It is thus possible to easily set unique wavelengths for transmission in a plurality of optical transceivers connected to the same wavelength division multiplex device.

The present invention according to sixth aspect is the optical transceiver according to first aspect, in which the memory unit stores, as the program, an optical input level monitoring program configured to cause the CPU to execute processing of monitoring a received signal level at the optical receiver, and a second optical output control program configured to cause the CPU to execute transmission interruption processing of detecting that an input is interrupted when the optical level by the monitoring is not detected in the optical transceiver on a reception side and stopping a transmission signal.

With this configuration, the optical level by the monitoring is not detected in the optical transceiver on the reception side when an optical fiber that connects the optical transceivers is damaged or disconnected. At this time, the CPU of this optical transceiver performs input interruption detection through execution of the second optical output control program and further performs transmission interruption control for stopping the transmission signal from the optical transmitter. Because the signal light to the optical transceiver on the counterpart side is stopped due to the transmission interruption control, the optical level by the monitoring is not detected in this optical transceiver. In this case, the CPU of this optical transceiver can perform transmission interruption processing of performing input interruption detection and stopping the transmission signal. Thus, it is possible to immediately stop signal light transmitted from both optical transceivers when the optical fiber is damaged or disconnected and thereby to stop radiation of high-power signal light that leaks from the damaged or disconnected portion and may adversely affect the human body.

Effects of the Invention

According to the present invention, it is possible to provide an optical transceiver that allows addition of new functions to an optical module at low costs.

DESCRIPTION OF EMBODIMENTS

Embodiments of the present invention will be described below with reference to the drawings. However, the same reference signs will be applied to corresponding components in all the drawings in the specification, and description thereof will appropriately be omitted.

Configuration of Embodiment

Figure 1:
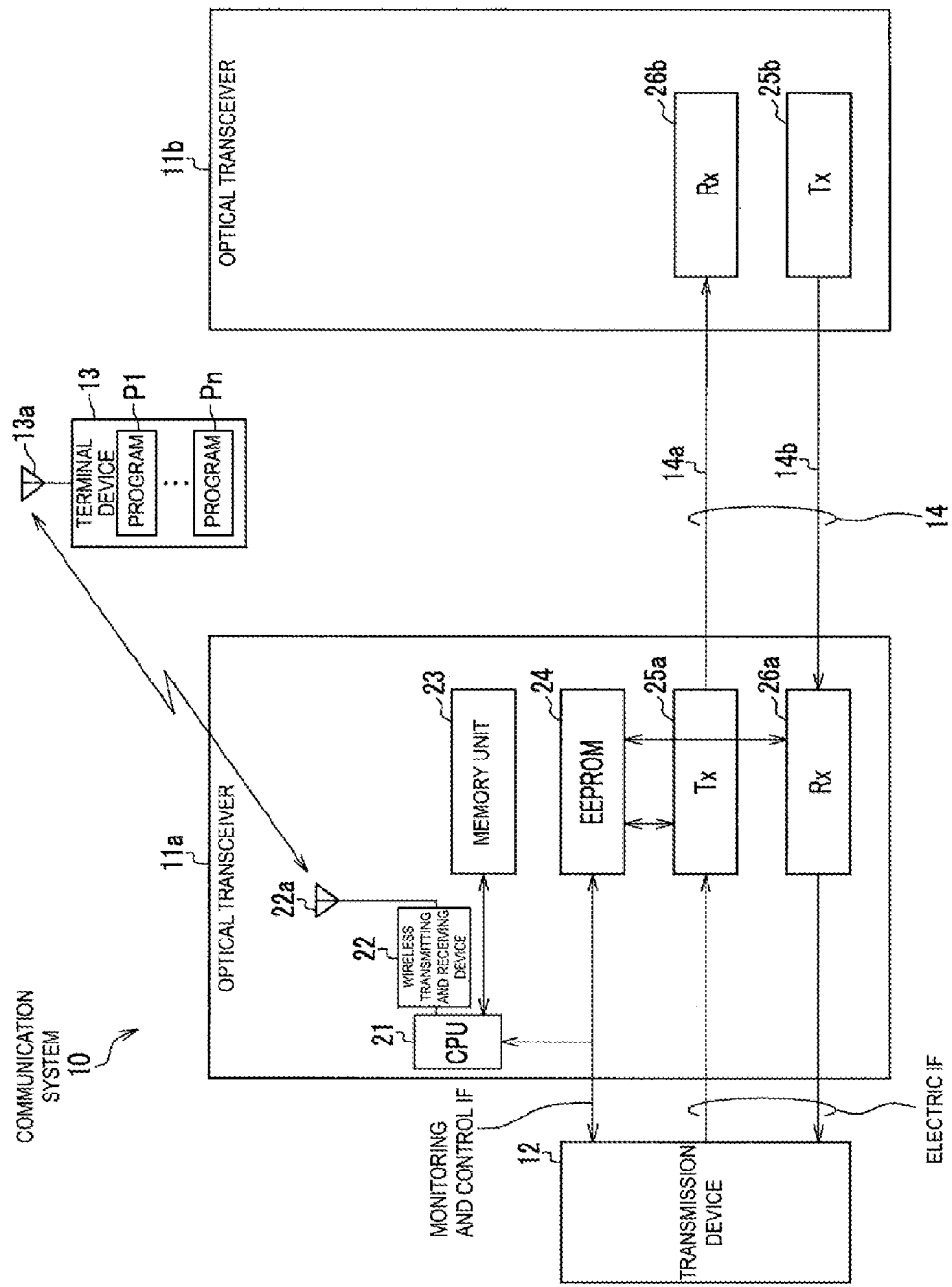
FIG. 1 is a block diagram illustrating a configuration of a communication system provided with optical transceivers according to an embodiment of the present invention.

FIG. 1 is a block diagram illustrating a configuration of a communication system provided with optical transceivers according to an embodiment of the present invention.

A communication system 10 illustrated in FIG. 1 is configured to include two optical transceivers 11a and 11b mounted on individual small-sized optical modules (not illustrated), a transmission device 12, and a terminal device 13 that has an antenna 13a. The optical transceivers 11a and 11b are connected using an optical cable 14 that includes a pair of bidirectional optical fibers 14a and 14b that serve as optical interfaces (IFs). Note that because the optical transceivers 11a and 11b have the same configuration, the optical transceiver 11a that is one of them will be described as a representative.

The transmission device 12 is a device that can be connected to a small-sized optical module including a server, a router, a personal computer (PC), or the like.

The terminal device 13 is communication information processing, such as a computer or the like that has a communication function, a data holding function, and a data processing function. The terminal device 13 stores, in a readable and writable memory such as a hard disk, various programs P1 to Pn for achieving various functions such as a wavelength tunable function compatible with WDM in the optical transceivers 11a and 11b.

By the optical module (not illustrated) being attached to the external transmission device 12 via a monitoring and control IF and an electric IF in a pluggable manner, the optical transceiver 11a is electrically connected to the transmission device 12. The optical transceiver 11a includes a Central Processing Unit (CPU) 21, a wireless transmitting and receiving device 22 that has an antenna 22a, a memory unit 23, an Electrically Erasable Programmable Read-Only Memory (EEPROM) 24, a Tx (optical transmitter) 25a, and a Rx (optical receiver) 26a. Note that different reference signs 25b and 26b are applied to Tx and Rx respectively described in the other optical transceiver 11b.

The memory unit 23 is a readable and writable memory such as a flash memory or a Static Random Access Memory (SRAM) and stores software (not illustrated) of an Operating System (OS) for activating the CPU 21 and data such as programs.

The EEPROM 24 is a data readable and writable nonvolatile memory and enables monitoring and control of the Tx 25a and the Rx 26a by the transmission device 12 reading and writing data (values) at a specific address via the monitoring and control IF.

Also, the EEPROM 24 stores data related to programs stored in the memory unit 23 as will be described below. The storage is performed by the CPU 21 writing wavelength data related to execution of a program for wavelength control, for example, stored in the memory unit 23 in a storage area at a specific address in the EEPROM 24. It is possible to determine a wavelength of a transmission signal from the Tx 25a by the CPU 21 reading the written wavelength data.

The wireless transmitting and receiving device 22 receives corresponding programs P1 to Pn from the terminal device 13 through wireless communication in accordance with control performed by the CPU 21 to download programs (referred to as download control) for achieving predetermined functions.

The CPU 21 performs processing of receiving and downloading a program of a new function (also referred to as an additional function) to be added to the optical transceiver 11a from the terminal device 13 via the wireless transmitting and receiving device 22 and storing the program in the memory unit 23. Here, the new function is a function other than existing functions that the optical transceiver 11a currently has. In the embodiment, newly adding a new function corresponds to a case in which a new function other than the existing functions is added and a case in which a certain existing function is overwritten with and changed to a new function.

Further, the CPU 21 can read and write data in the EEPROM 24 by interrupting a monitoring and control signal from the transmission device 12. The CPU 21 uses this function to perform processing of storing wavelength data at the time of determining a wavelength, for example, in the EEPROM 24 in accordance with the program for executing the additional function stored in the memory unit 23 by interrupting the monitoring and control signal from the transmission device 12.

In this manner, the CPU 21 downloads the program for executing the additional function via the wireless transmitting and receiving device 22 and stores the program in the memory unit 23 through the aforementioned download control, and further stores, in the EEPROM 24, data in accordance with the program for executing the additional function stored in the memory unit 23 by interrupting the monitoring and control signal. This storage processing enables addition of a new function without changing setting of the external transmission device 12 connected to the optical transceiver 11a via the monitoring and control IF and the electric IF.

The Tx 25a converts the electrical signal input from the transmission device 12 via the electric IF into an optical signal and transmits the optical signal to one optical fiber 14a.

The Rx 26a converts the optical signal received via the other optical fiber 14b into an electrical signal and outputs the electrical signal to the transmission device 12 via the electric IF.

Operations in Embodiment

Operations of the optical transceivers 11a and 11b according to the embodiment will be described. The CPU 21 downloads a program for executing an additional function from the terminal device 13 via the wireless transmitting and receiving device 22 and stores the program in the memory unit 23 through the download control.

Further, the CPU 21 stores, in a storage area at a specific address in the EEPROM 24, wavelength data at the time of determining a wavelength of a transmission signal from the Tx 25a in accordance with the program for wavelength control, for example, stored in the memory unit 23 by interrupting the monitoring and control signal from the transmission device 12.

The wavelength of the transmission signal from the Tx 25a is determined in accordance with the wavelength data stored in the EEPROM 24.

Effects of Embodiment

Effects of the optical transceivers 11a and 11b according to the embodiment will be described. The optical transceiver (for example, the optical transceiver 11a) has the Tx (optical transmitter) 25a configured to convert an electrical signal input from the transmission device 12 that transmits a signal into an optical signal and output the optical signal, the Rx (optical receiver) 26a configured to convert an optical signal received via the optical IF into an electrical signal and output the electrical signal to the transmission device 12, and the EEPROM (nonvolatile memory) 24 configured to allow the transmission device 12 to read and write data in a storage area at a specific address such that the Tx 25a and the Rx 26a are able to be controlled. Characteristic configurations of such an optical transceiver 11a will be described.

The optical transceiver 11a includes the CPU 21 configured to perform download control of a program for executing an additional function newly added to the optical transceiver 11a, the wireless transmitting and receiving device 22 configured to receive, in accordance with the download control, the program from the terminal device 13 that stores various programs, and the memory unit 23 configured to store the program that is received. The CPU 21 is configured to perform control to write, in a storage area at a specific address in the EEPROM 24, data related to transmission and reception processing of the Tx 25a and the Rx 26a in accordance with execution of the programs stored in the memory unit 23 by interrupting a monitoring and control signal from the transmission device 12.

With this configuration, the CPU 21 downloads the program for executing the additional function from the terminal device 13 using the wireless transmitting and receiving device 22 and stores the program in the memory unit 23 through the download control, and further stores, in the EEPROM, data related to the program for executing the additional function stored in the memory unit 23 by interrupting the monitoring and control signal. Through this storage processing, it is possible to add the new function without changing setting of the external transmission device 12 connected to the optical transceiver 11a. It is thus not necessary to verify the transmission device 12 unlike the related art in which addition of a new function leads to an increase in costs. As a result, it is possible to achieve the optical transceivers 11a and 11b capable of adding new functions to an optical module at low costs. The low costs mean that costs that accompany a verification time, a number of operation processes, and the like when new functions are added to an optical module are reduced.

First Application Example of Embodiment

Figure 2:
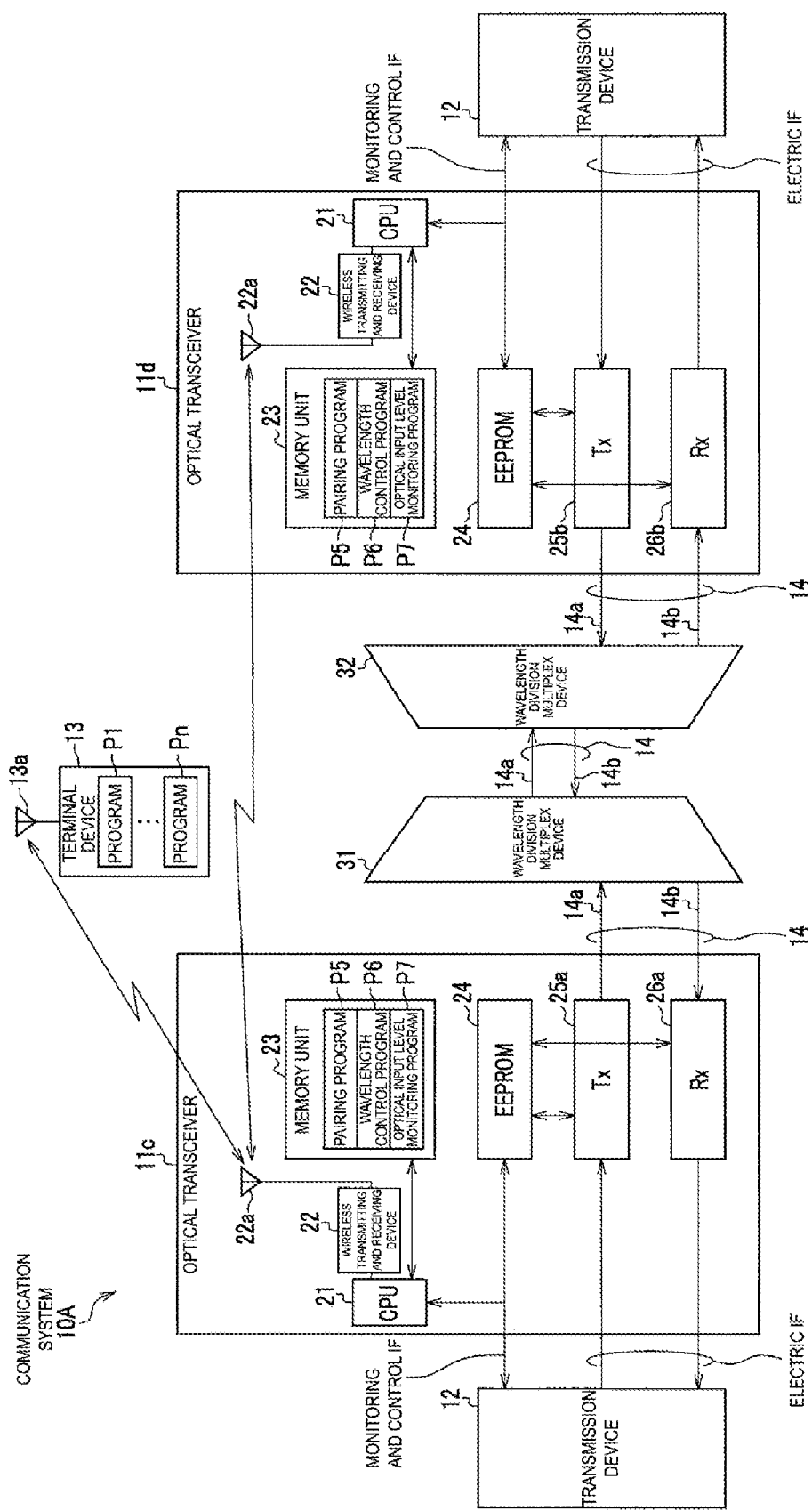
FIG. 2 is a block diagram illustrating a configuration of a communication system provided with optical transceivers according to a first application example of the embodiment of the present invention.

FIG. 2 is a block diagram illustrating a configuration of a communication system provided with optical transceivers according to a first application example of the embodiment of the present invention.

A communication system 10A illustrated in FIG. 2 is a WDM communication system in which optical transceivers 11c and 11d are connected to each other with an optical cable 14 via wavelength division multiplex devices 31 and 32 unlike the aforementioned communication system 10 (FIG. 1). The optical transceivers 11a and 11b are separated from each other by a distance at which the optical transceivers 11a and 11b can perform wireless communication using wireless transmitting and receiving devices 22.

The optical transceivers 11c and 11d in the first application example are different from the optical transceivers 11c and 11d in the aforementioned embodiment in that a pairing program P5, a wavelength control program P6, and an optical input level monitoring program P7, which will be described below, are stored in the memory unit 23. Note that the pairing program P5, the wavelength control program P6, and the optical input level monitoring program P7 will also be referred to as programs P5, P6, and P7 respectively.

The CPU 21 performs pairing (which will be described below) in accordance with the pairing program P5 and then fixes a transmission wavelength when an optical input level monitored in accordance with the optical input level monitoring program P7 reaches a proper level while performing wavelength control (which will be described below) in accordance with the wavelength control program P6.

The storage of each program P5 to P7 in the memory unit 23 is performed by the CPU 21 performing the download control for downloading the programs P5 to P7 on the wireless transmitting and receiving device 22 and by the wireless transmitting and receiving device 22 downloading the programs P5 to P7 from the terminal device 13 and storing the programs P5 to P7 in the memory unit 23.

The pairing program P5 is a program for causing the CPU 21 to execute an operation of establishing pairing for allowing the pair of optical transceivers 11c and 11d to synchronously transmit and receive signal light by performing wireless communication between the wireless transmitting and receiving device 22 and the wireless transmitting and receiving device 22 of the other optical transceiver.

This will be further described. The wireless transmitting and receiving device 22 of one optical transceiver 11c performs wireless communication with the wireless transmitting and receiving device 22 of the other optical transceiver 11d by the CPU 21 executing the pairing program P5. In a case in which signal transmission and reception between both the optical transceivers 11c and 11d are properly performed through the wireless communication, the CPU 21 establishes pairing in which the mutual optical transceivers 11c and 11d serve as a pair and synchronously transmit and receive signals. In this pairing, transmission and reception timings of the signals of both the optical transceivers 11c and 11d are matched. In other words, communication between both the optical transceivers 11c and 11d is synchronized.

The optical input level monitoring program P7 is a program for causing the CPU 21 to execute processing of monitoring a received signal level at the Rx 26a and detecting that the level reaches a proper level.

The wavelength control program P6 is a program for causing the CPU 21 to execute control of fixing a wavelength of a swept transmission signal at a timing when the received signal reaches a proper level in the monitoring while sweeping the wavelength of signal light transmitted from the Tx 25a after the pairing.

However, the CPU 21 may store data related to the wavelength control program P6 and the optical input level monitoring program P7 in the EEPROM 24 as follows when the CPU 21 performs processing using these programs P6 and P7. In other words, the CPU 21 performs, by interrupting the monitoring and control signal from the transmission device 12, processing of storing, in the EEPROM 24, wavelength data determined in accordance with the wavelength control program P6 stored in the memory unit 23 and monitor data related to the reception level monitoring of the Rx 26a monitored in accordance with the optical input level monitoring program P7 stored in the memory unit 23. The processing of storing the programs in the EEPROM 24 is similarly performed for programs in second to fourth application examples, which will be described below.

In the optical transceivers 11c and 11d with such a configuration, the CPU 21 performs download control in which the CPU 21 downloads the programs P5 to P7 on the wireless transmitting and receiving device 22 first, and the wireless transmitting and receiving device 22 downloads the programs P5 to P7 from the terminal device 13 and stores the programs P5 to P7 in the memory unit 23.

Next, in a certain optical transceiver 11c, the wireless transmitting and receiving device 22 performs wireless communication by the CPU 21 executing the pairing program P5 stored in the memory unit 23. In a case in which it is possible to perform proper communication with the wireless transmitting and receiving device 22 of the optical transceiver 11d through the wireless communication operation, the CPU 21 establishes pairing in which both the optical transceivers 11c and 11d in communication serve as a pair and synchronously transmit and receive signal light.

Next, the CPU 21 monitors the received signal level at the Rx 26a using the monitor data stored in the EEPROM 24 while sweeping the wavelength of the signal light transmitted horn the Tx 25a using the wavelength data similarly stored therein. The wavelength of the transmission signal light of the Tx 25a swept at the timing at which reaching of the received signal level to the proper level is detected by the monitoring is fixedly set.

According to the optical transceivers 11c and 11d in the first application example with such a configuration, it is possible to automatically set the wavelength of signal light transmitted and received via the optical cable 14 when the optical transceivers 11e and 11f perform communication.

Second Application Example of Embodiment

Figure 3:
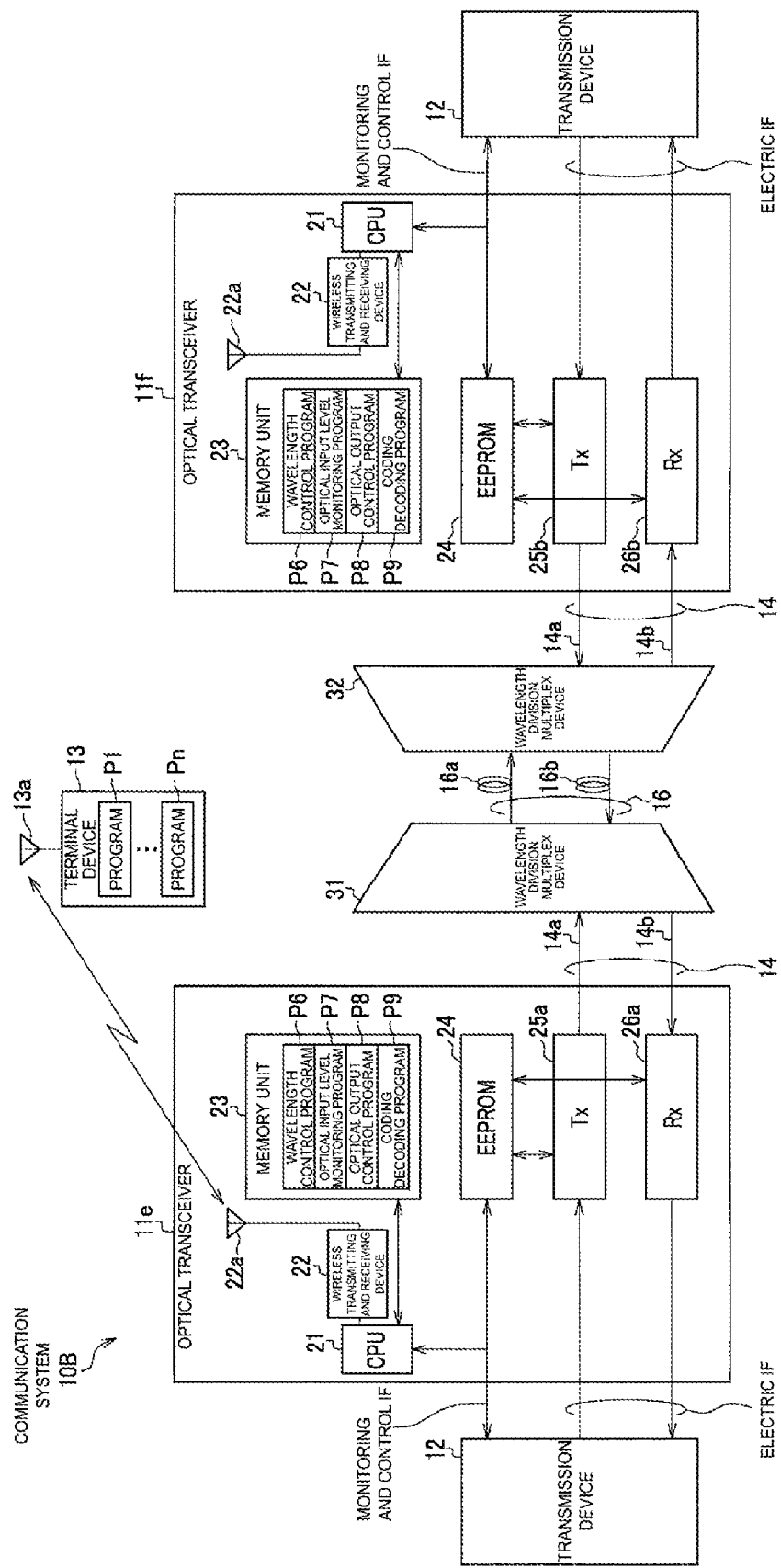
FIG. 3 is a block diagram illustrating a configuration of a communication system provided with optical transceivers according to a second application example of the embodiment of the present invention.

FIG. 3 is a block diagram illustrating a configuration of a communication system provided with optical transceivers according to a second application example of the embodiment of the present invention.

A communication system 10B illustrated in FIG. 3 is different from the aforementioned communication system 10A (FIG. 2) in that optical transceivers 11e and 11f are separated from each other by a distance at which the optical transceivers 11e and 11f cannot perform wireless communication with each other using wireless transmitting and receiving devices 22. In other words, wavelength division multiplex devices 31 and 32 are connected to each other with an optical cable 16 including a pair of bidirectional optical fibers 16a and 16b with long distances which radio waves for the wireless communication do not reach.

Also, the optical transceivers 11e and 11f according to the second application example store, in the memory unit 23, an optical output control program P8 and a coding decoding program P9, which will be described below, in addition to the aforementioned wavelength control program P6 and the optical input level monitoring program P7.

The optical transceivers 11e and 11f can automatically set transmitting and receiving wavelengths by changing wavelengths of output signals using the wavelength control program P6 in a non-synchronous manner.

The optical output control program P8 is a program for causing the CPU 21 to execute, when an optical input (optical reception) of the Rx (for example, the Rx 26a) is detected through the optical input level monitoring of one optical transceiver 11e, processing of notifying the optical transceiver 11f on the counterpart side of reception notification data for letting the optical transceiver 11f to know reception of signal light through this detection using a specific wavelength.

Figure 4:
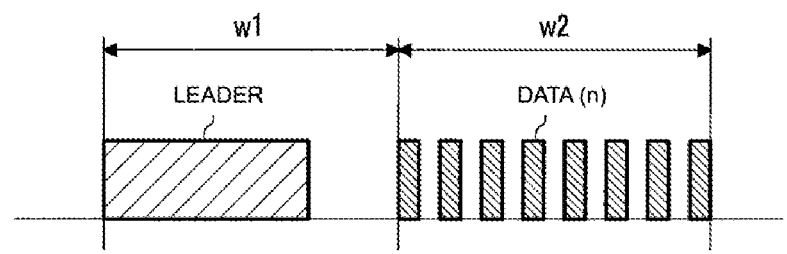
FIG. 4 is a diagram illustrating a configuration of reception notification data transmitted from the optical transceiver according to the second application example.

Here, the specific wavelength is a wavelength determined in advance. Also, the reception notification data (data) is configured of a combination of a 1 level and a 0 level (1, 0) as illustrated as data (n) of the length w2 in FIG. 4. Note that the leader represented with the length w1 on the front side of the data (n) represents the head of the data (n).

In other words, the notification of the reception notification data is performed by causing the level of the signal light transmitted from the Tx 25a of the optical transceiver lie to vary to 1, 0. This will be described further. By the CPU 21 executing the optical output control program P8, the optical transceiver 11b on the counterpart side is notified of the reception notification data generated by causing the optical level of the transmission signal light from the Tx 25a to vary at a cycle that is shorter than a cycle of a change in wavelength of the transmission signal light through the wavelength control program P6 and that is longer than a detection cycle of the optical input level monitoring.

In this manner, it is possible to cause the optical level to vary at the same wavelength and set the data to be a proper value by setting the variation of the optical level to be shorter than the cycle of the change in wavelength of the transmission signal light. Also, it is possible to properly monitor the varying signal light on the reception side by causing the optical level to vary at a cycle that is longer than the detection cycle of the optical input level monitoring.

Figure 5:
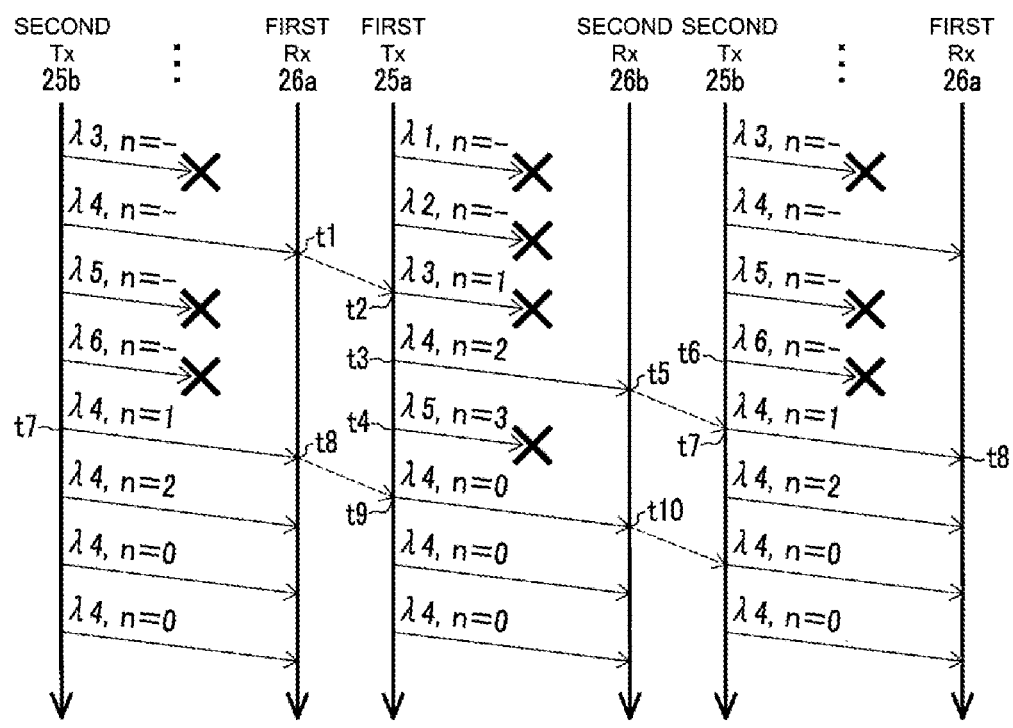
FIG. 5 is a sequence diagram of transmission and reception of wavelengths and reception notification data of signal light transmitted and received between optical transceivers according to the second application example.

The optical transceivers 11e and 11f cannot receive signal light with wavelength other than the specific wavelength. As illustrated in FIG. 5, for example, a first Rx 26a of the optical transceiver 11e and a second Rx 26b of the optical transceiver 11f can receive signal light only with a specific wavelength λ4. Signal light with other wavelengths λ1, λ2, λ3, λ4, λ5, and λ6 cannot be received.

Note that in FIG. 5, the Tx 25a of the optical transceiver 11e is defined as the first Tx 25a while the Rx 26a is defined as the first Rx 26a. The Tx 25b of the optical transceiver 11f is defined as the second Tx 25b while the Rx 26b is defined as the second Rx 26b. Also, λ1, λ2, λ3, λ4, λ5, and λ6 represent different wavelengths n=0, n=1, n=3, and n=4 represent different data. n=-represents that there is no data.

The optical transceivers 11e and 11f cannot receive the signal optical with wavelengths other than the specific wavelength at the Rx 26a and the Rx 26b as described above and further cannot detect wavelength of signal light received by the Rx 26a and the Rx 26b although the optical transceivers 11e and 11f can detect the optical levels at this time.

Thus, the CPU 21 sequentially changes the wavelength of the Tx by a specific wavelength (expressed as one by one, for example) at a specific cycle through wavelength control at the same time with monitoring of the optical input level.

At this time, in a case in which an optical input is detected through the monitoring, the CPU 21 starts a numerical value n representing a timing at which the optical input is detected from "1", and codes the numerical value n while incrementing the numerical value n and the wavelength one by one through execution of the optical output control program P8 and the coding decoding program P9. Further, the CPU 21 notifies the optical transceiver 11e or 11f on the counterpart side of detection of the optical input while causing the optical level of the transmission signal light of the wavelength corresponding to the data to vary in accordance with the coded data. The optical transceiver 11e or 11f that has received the notification decodes the data using the coding decoding program P9.

The processing will be described with reference to FIG. 5. In a case in which an optical input is detected by the monitoring at the timing it illustrated in FIG. 5, the CPU 21 starts the numerical value n representing the timing at which the optical input is detected from "1", and codes the numerical value n while incrementing the numerical value n and the wavelength one by one at the timings t2 to t4. In other words, signal light of "λ3, n=1" is transmitted at the timing t2, signal light of "λ4, n=2" is transmitted at the timing t3, and signal light of "λ5, n=3" is transmitted at the timing t4, from the first Tx 25a.

At this time, wavelengths of "λ3, n=1" at the timing t2 and "λ5, n=3" at the timing t4 are different from the specific wavelength λ4 and are not received by the second Rx 26b. Signal light of "λ4, n=2" at the timing t3 has the specific wavelength λ4 and is thus received by the second Rx 26b.

In a case in which a notification (reception notification data) of the optical input detection is received from the optical transceiver 11e on the counterpart side in this manner, the CPU 21 of the optical transceiver 11f on the reception side returns the wavelength by the amount of wavelength corresponding to the numerical value representing the detection timing in the reception notification data and fixedly sets the returned wavelength. Further, the CPU 21 codes content representing that the setting of the wavelength has been completed and notifies the optical transceiver 11e on the counterpart side of the content with the same specific wavelength.

The processing will be described with reference to FIG. 5. In a case in which the second Rx 26b receives the signal light of "λ4, n=2" at the timing t5, the CPU 21 of the optical transceiver 11f on the reception side returns, to λ4, the wavelength λ6 in the second Tx 25b as illustrated at the timing t6 by the amount of wavelength "2" corresponding to the numerical value "2" representing the received detection timing as illustrated at the timing t7. The CPU 21 fixedly sets the wavelength to λ4 obtained by returning the wavelength. Further, the CPU 21 codes the content "n=1" representing that setting of the wavelength λ4 has been completed and notifies the optical transceiver 11e on the counterpart side of the content with the same wavelength λ4. The notification is received by the first Rx 26a at the timing t8.

At the time of the reception, the wavelength of the signal light from the first Tx 25a of the optical transceiver 11e is set to λ4. Thereafter, "n=0" indicating that the wavelength has been set to λ4 is transmitted in the signal light with the wavelength λ4 from the first Tx 25a at the timing t9, and the signal light is received by the second Tx 25b on the counterpart side at the timing t10. Thereafter, "λ4, n=0" is transmitted and received between both the Tx and the Rx.

According to the optical transceivers 11e and 11f in the second application example, it is possible to automatically set the wavelength of the transmitted and received signal light even in a case in which it is not possible to perform wireless communication using mutual wireless transmitting and receiving devices 22.

Third Application Example of Embodiment

Figure 6:
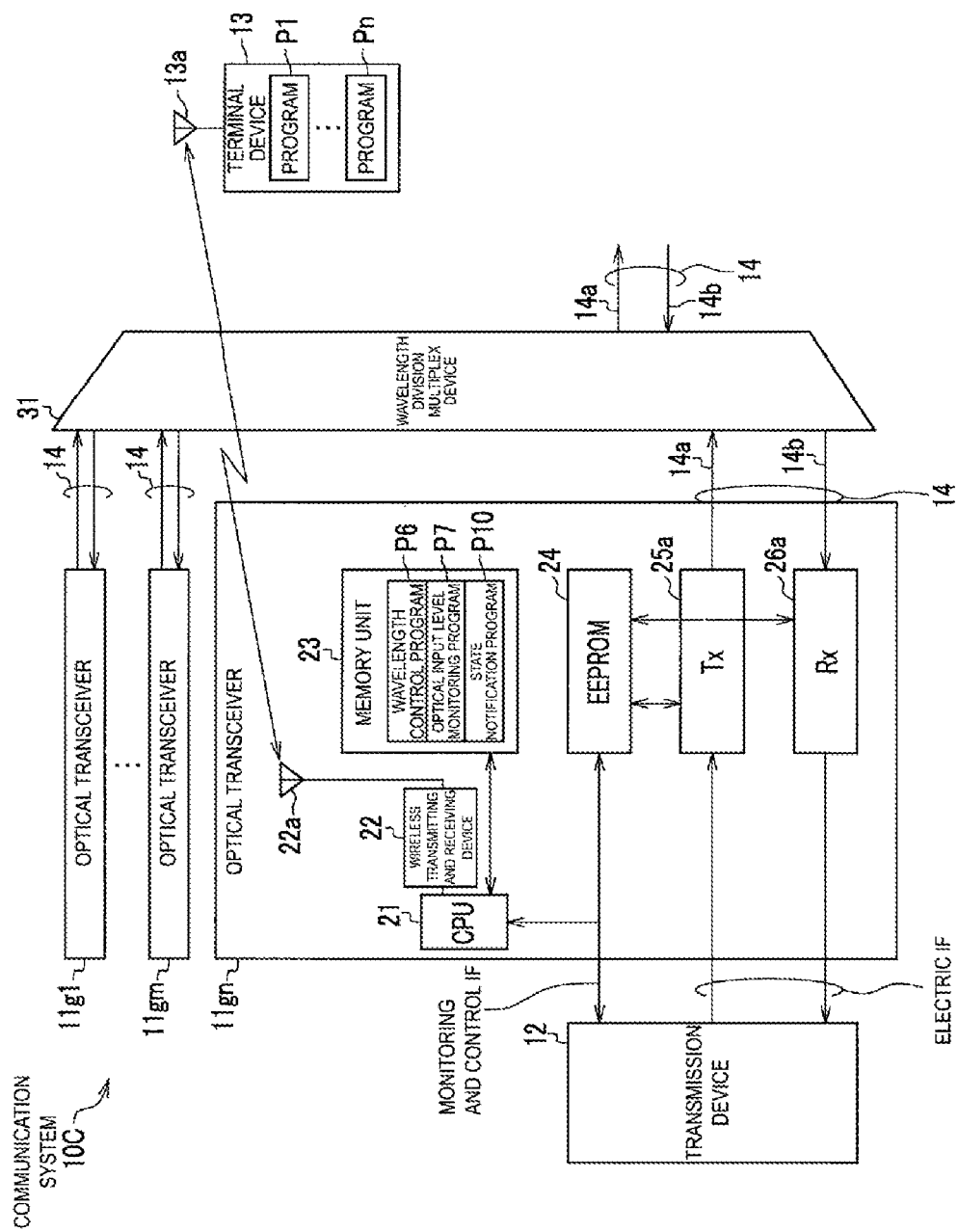
FIG. 6 is a block diagram illustrating a configuration of a communication system provided with optical transceivers according to a third application example of the embodiment of the present invention.

FIG. 6 is a block diagram illustrating a configuration of a communication system provided with optical transceivers according to a third application example of the embodiment of the present invention.

In a communication system 10C illustrated in FIG. 6, a plurality of optical transceivers 11gl, . . . , 11gm, 11gn with the same configuration are connected to the wavelength division multiplex device 31 with the optical cable 14.

The communication system 10C illustrated in FIG. 6 is different from the aforementioned communication system 10A (FIG. 2) in that a state notification program P10, which will be described below, is stored in the memory unit 23 in addition to the aforementioned wavelength control program P6 and optical input level monitoring program P7.

The state notification program P10 is a program for causing the CPU 21 to execute processing in which a certain optical transceiver (for example, the optical transceiver 11gn) receives wavelengths that are set for a plurality of other optical transceivers 11gl to 11gm connected to the wavelength division multiplex device 31 inserted between the certain transceiver and an opposite optical transceiver (not illustrated) via the wireless transmitting and receiving device 22 and sets a wavelength other than the received wavelength as a wavelength for transmission.

Specifically, it is assumed that a certain optical transceiver 11gn has received a control start signal from an optical transceiver, which is disposed on the counterpart side (not illustrated) via the optical cable 14, via the wireless transmitting and receiving device 22. At this time, the optical transceiver gn transmits a request for asking for a state notification, which will be described below, to the other optical transceivers 11gl to 11gm connected to the same wavelength division multiplex device 31 via the wireless transmitting and receiving device 22. If the other optical transceivers 11gl to 11gm are under sweeping at this time, the request is sent again after waiting for a time required for setting the wavelength.

The optical transceiver (for example, the optical transceiver 11gl) that has received the request notifies the optical transceiver 11gn that has requested the notification that the setting of the wavelength is being processed in a case in which the optical transceiver 11gl itself is performing the processing of setting the wavelength or notifies the optical transceiver 11gn of unique information of the set wavelength in a case in which the processing of setting the wavelength has been completed.

In a case in which the notification that the setting of the wavelength is being processed has not been received, the optical transceiver 11gn on the request transmission side executes processing of starting wavelength setting processing by excluding the wavelength that has already been set.

Figure 7:
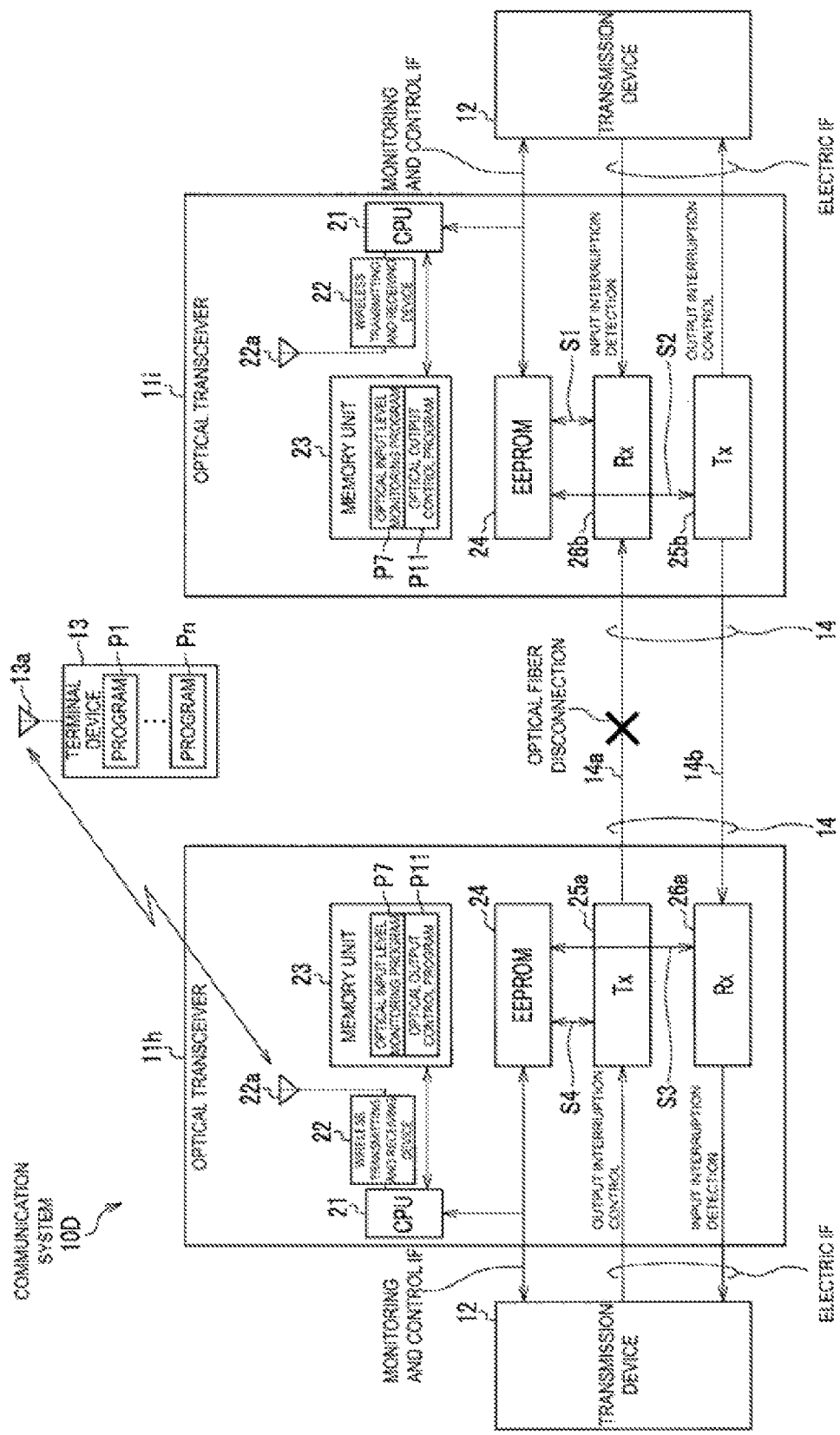
FIG. 7 is a block diagram illustrating a configuration of a communication system provided with optical transceivers according to a fourth application example of the embodiment of the present invention.

According to the optical transceivers 11gl to 11gn with such a configuration, it is possible to easily set the unique wavelength for transmission when the plurality of optical transceivers 11gl to 11gn are connected to the wavelength division multiplex device 31 for performing communication with the optical transceiver on the counterpart side by performing wavelength division multiplex, Fourth Application Example of Embodiment FIG. 7 is a block diagram illustrating a configuration of a communication system provided with optical transceivers according to a fourth application example of the embodiment of the present invention.

A communication system 10D illustrated in FIG. 7 is different from the aforementioned communication system 10 (FIG. 1) in that an optical output control program P11, which will be described below, is stored in the memory units 23 of the optical transceivers 11h and 11i in addition to the aforementioned optical input level monitoring program P7.

The optical output control program (second optical output control program) P11 is a program for causing the CPU 21 to execute processing of detecting that an input is interrupted when it becomes not possible to detect the optical level by the optical input level monitoring in the optical transceiver on the reception side (for example, the optical transceiver 11i) and then performing transmission interruption control of stopping the transmission signal from the Tx 25b.

If it is assumed that the optical fiber 14a connecting the optical transceivers 11h and 11i has been damaged or disconnected as represented by the X mark in FIG. 7, it is not possible to detect the optical level by the optical input level monitoring in the optical transceiver 11i on the reception side. In this case, the CPU 21 of the optical transceiver 11i performs input interruption detection by executing the optical output control program P11 and further performs transmission interruption control of stopping the transmission signal from the Tx 25b.

Because the signal light to the optical transceiver 11h on the counterpart side is stopped through the transmission interruption control, it becomes not possible to detect the optical level by the optical input level monitoring in the optical transceiver 11h. In this case, the CPU 21 of the optical transceiver 11h performs input interruption detection by executing the optical output control program P11 and further performs transmission interruption control of stopping the transmission signal from the Tx 25a. In this manner, the entire signal light transmitted and received between the optical transceivers 11h and 11i is stopped.

With such a configuration, it is possible to immediately stop signal light transmitted from both the optical transceivers 11h and 11i when the optical fibers 14a and; or 14b connecting the optical transceivers 11h and 11i are damaged or disconnected and thereby to stop radiation of high-power signal light that leaks from the damaged or disconnected portion and may adversely affect human bodies.

In addition, a specific configuration can be changed as appropriate without departing from the spirit of the present invention.

REFERENCE SIGNS LIST 10, 10A, 10B, 10C, 10D Communication system
11a, 11b, 11c, 11d, 11e, 11f, 11h, 11i Optical transceiver
11gl, . . . , 11gm, 11gn Optical transceiver
12 Transmission device
13 Terminal device
14a, 14b, 16a, 16b Optical fiber
14, 16 Optical cable
21 CPU
22 Wireless transmitting and receiving device
23 Memory unit
24 EEPROM
25a, 25b Tx (optical transmitter)
26a, 26b Rx (optical receiver)
31, 32 Wavelength division multiplex device
P5 Pairing program
P6 Wavelength control program
P7 Optical input level monitoring program
P8 Optical output control program
P9 Coding decoding program
P10 State notification program
P11 Optical output control program (second optical output control program)

The invention claimed is:

1. An optical transceiver that includes an optical transmitter configured to convert an electrical signal input from a transmission device that transmits a signal into an optical signal and output the optical signal, an optical receiver configured to convert an optical signal received via an optical interface (IF) into an electrical signal and output the electrical signal to the transmission device, and a nonvolatile memory configured to allow the transmission device to read and write data in a storage area at a specific address such that the optical transmitter and the optical receiver are able to be controlled, the optical transceiver comprising:

a Central Processing Unit (CPU) configured to perform download control of a program for executing an additional function to be newly added to the optical transceiver;

a wireless transmitting and receiving device configured to receive, in accordance with the download control, the program from a terminal device that stores various programs; and a memory unit configured to store the program that are received, wherein the CPU is configured to perform, by interrupting a monitoring and control signal from the transmission device, control to write, in the storage area at the specific address in the nonvolatile memory, data related to transmission and reception processing of the optical transmitter and the optical receiver in accordance with execution of the program stored in the memory unit, wherein the memory unit is configured to store, as the program, a pairing program configured to cause the CPU to execute processing of establishing pairing in which the optical transceiver and an opposite optical transceiver perform wireless communication with each other using the wireless transmitting and receiving device and transmission and reception of signal light via the optical IF are synchronously performed, an optical input level monitoring program configured to cause the CPU to execute processing of monitoring a received signal level at the optical receiver, and a wavelength control program configured to cause the CPU to execute processing of sweeping a wavelength of a transmission signal from the optical transmitter and fixing a wavelength resulting from the sweeping at a timing at which a received signal level that is monitored by the monitoring reaches a proper level.

2. The optical transceiver according to claim 1, wherein the memory unit is configured to store, as the program, an optical input level monitoring program configured to cause the CPU to execute processing of monitoring a received signal level at the optical receiver, a wavelength control program configured to cause the CPU to execute processing of sweeping a wavelength of a transmission signal from the optical transmitter and fixing a wavelength by the sweeping at a timing at which a received signal level by the monitoring reaches a proper level, and an optical output control program configured to cause the CPU to execute processing of increasing, when a proper received signal level is detected by the monitoring, a numerical value representing a detection timing of the proper received signal level and a wavelength for signal transmission by specific amounts respectively, transmitting a numerical value resulting from the increasing in a transmission signal with a transmission level varying in accordance with a numerical value and with a wavelength resulting from the increasing to an opposite optical transceiver, and setting a wavelength by returning the wavelength by an amount of wavelength corresponding to a numerical value representing the detection timing received by the opposite optical transceiver.

3. The optical transceiver according to claim 2, wherein by the CPU executing the optical output control program, reception notification data is generated by causing an optical level of transmission signal light from the optical transmitter to vary at a cycle that is shorter than a cycle of a change in wavelength of the transmission signal light through execution of the wavelength control program and that is longer than a detection cycle of the monitoring of an optical input level through execution of the optical input level monitoring program, and the opposite optical transceiver is notified of the reception notification data.

4. The optical transceiver according to claim 1, wherein the memory unit is configured to store, as the program, an optical input level monitoring program configured to cause the CPU to execute processing of monitoring a received signal level at the optical receiver, a wavelength control program configured to cause the CPU to execute processing of sweeping a wavelength of a transmission signal from the optical transmitter and fixing a wavelength by the sweeping at a timing at which a received signal level by the monitoring reaches a proper level, and a state notification program configured to cause the CPU to execute processing in which the optical transceiver receives a wavelength that is set for another optical transceiver connected to a wavelength division multiplex device via the wireless transmitting and receiving device and sets a wavelength other than the wavelength that is received as a wavelength for transmission, the wavelength division multiplex device being inserted between the optical transceiver itself and an opposite optical transceiver.

5. The optical transceiver according to claim 1, wherein the memory unit is configured to store, as the program, an optical input level monitoring program configured to cause the CPU to execute processing of monitoring a received signal level at the optical receiver, and a second optical output control program configured to cause the CPU to execute transmission interruption processing of detecting that an input is interrupted when an optical level by the monitoring is not detected in the optical transceiver on a reception side and stopping a transmission signal.

* * * * *